United States Patent [19]

Eggendorfer

[11] Patent Number: 5,227,944
[45] Date of Patent: Jul. 13, 1993

[54] BREAKER FOR SURGE PROTECTOR

[75] Inventor: Andreas J. Eggendorfer, Goleta, Calif.

[73] Assignee: Alan Scientific Corporation, Santa Barbara, Calif.

[21] Appl. No.: 783,321

[22] Filed: Oct. 28, 1991

[51] Int. Cl.⁵ .............................................. H02H 5/04
[52] U.S. Cl. .................................. 361/103; 361/126; 361/274; 337/34
[58] Field of Search ............... 361/104, 106, 124, 126, 361/105, 103, 125, 126, 274, 275; 337/34

[56] References Cited

U.S. PATENT DOCUMENTS 4,240,126  12/1980  Sanvito ............................ 361/274
4,812,941   3/1989  Rice et al. ........................ 361/272

Primary Examiner—Todd E. DeBoer
Attorney, Agent, or Firm—Elliott N. Kramsky

[57] ABSTRACT

A breaker assembly for use in conjunction with a surge or lightning arrestor of the type that includes at least one varistor. The varistor circuit is enclosed within a substantially airtight housing that includes a hinged panel. A cantilevered arm is fixed to the hinged panel and includes, adjacent its free end, an aperture for interlocking a post. A conductive disk is fixed to the post and positioned vertically with respect to conductive arms to complete a circuit that includes the surge arrestor. The action of upper and lower springs, in conjunction with the post, serves to close or open such circuit. The position of the post is locked by the interaction of a notch therein with the cantilevered arm so that the opening and closing of the breaker switch is regulated by the attitude of the front panel of the housing that is, in turn, responsive to varistor-generated vapor pressure therein.

9 Claims, 2 Drawing Sheets

BREAKER FOR SURGE PROTECTOR

BACKGROUND

1. Field of the Invention

The present invention relates to apparatus for protecting electrical equipment from otherwise-harmful surges of the type that may arise, for example, during electrical storms. More particularly, this invention pertains to a breaker mechanism for reliably removing a surge protector from operation at the end of its useful life.

2. Description of the Prior Art

Surge arrestors are commonly employed to protect domestic electric devices, particularly on overhead supply lines leading to individual buildings, from transient or persistent overvoltages. Arrestor devices are also employed in houses supplied by underground cable as voltage surges can also occur in supply systems limited to underground cables just as in those using a combination of underground cables and overhead lines. Such devices are additionally employed to protect individual electrical devices that are particularly sensitive to overvoltages.

Surge arrestors act to limit the intensity of transient or persistent overvoltages. Low voltage arrestors employed in office buildings that have electrical installations, hospitals, lighting towers and installations protected by earth leakage circuit breakers prevent the undesired switching of such breakers which could otherwise be triggered by substantial overvoltages.

Surge or lightning arrestors typically employ voltage-dependent resistors, such as a silicon carbide or metal oxide (MOV) varistors. Such devices act somewhat in the manner of a Zener diode, with resistance to current flow decreasing as voltage increases to limit the maximum potential difference. At very high overvoltages, large current flow through the varistor circuit bleed the voltage peak levels on the line conductor to protect the connected electrical devices, with the varistor (or a parallel combination thereof) thereby acting as a voltage clamp.

Over time, such large flows of current will physically degrade the varistor. Each time a surge occurs, some damage will take place, increasing the leakage current of the device relative to a given voltage change. After an accumulation of damage over time, excessive device leakage currents will generate enough $i^2R$ heating to burn a hole in the device. The "end of life" of a lightning arrestor device means it will short circuit and draw excessive current until an interruption takes place or the device explodes, burns wires and causes fires.

Catastrophic failure of a surge arrestor can be quite dangerous, producing both fires and explosions. Accordingly, attempts have been made to remove or disconnect the surge arrestor from the line conductor before the end of its useful life. Generally, such efforts have relied upon the insertion of a fuse in series with the varistor circuit. Such a fuse will "blow" to disconnect the device from the a.c. or d.c. circuit by sensing the amount of current being drawn.

A significant drawback of such arrangements has been the difficulty of coordinating the action of the fuse with varistor failure. During certain events, such as thunderstorms, very large voltage transients may appear upon the line conductor. Such transients can induce large current flows that are of sufficient strength to cause the fuse to blow. However, the surge capacity of a fuse is not a direct measure of the integrity of the varistor's physical status which, as mentioned, is a function of time in the sense that damage to its current-handling capacity is cumulative. Thus, a fuse might blow despite the varistor's ability to handle many more episodes of overvoltage. In the case of a thunderstorm, which may last many hours, electrical devices can be left unprotected against overvoltage damage for hours by a fuse's blowing as a result of a current surge occurring relatively early. Thus fuse arrangements face the inherent design contradiction posed by the need for assured activation by a low resistance short while attaining sufficient current handling capacity to prevent premature surge arrestor disconnection.

SUMMARY OF THE INVENTION

The foregoing and other disadvantages of the prior art are addressed by the present invention that provides apparatus for selectively disconnecting a surge arrestor of the type that includes at least one voltage-dependent resistor from a line conductor. Such apparatus includes a substantially-airtight housing for accommodating the at least one voltage-dependent resistor. The housing includes a hinged panel so that the attitude thereof is substantially responsive to a variation in vapor pressure within the housing. Means, coupled to the panel, are provided for disconnecting the line conductor from the surge arrestor whereby the conductor is disconnected from the surge arrestor in response to an increase in vapor pressure within the housing.

The preceding and other features and advantages of this invention will become further apparent from the detailed description that follows. The description is accompanied by a set of drawing figures. Numerals of the drawing figures, corresponding to those of the written description, point to the various features of the invention, like numerals referring to like features throughout both the written description and the drawing figures.

DETAILED DESCRIPTION

Figure 1:
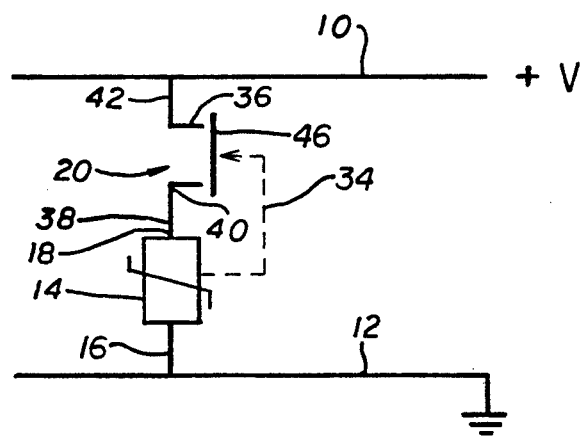
FIG. 1 is a circuit schematic diagram of the circuit breaker of the invention.

Turning now to the drawings, FIG. 1 is a circuit schematic diagram of a lightning or surge arrestor circuit that incorporates the circuit breaker of the invention. As shown, a line (or high a.c.) conductor 10 and a ground (or low a.c.) conductor 12 are separated by an arrestor circuit that includes at least one voltagedependent resistor 14. As mentioned earlier, the voltage dependent resistor or varistor 14 may be of the silicon carbide or MOV type and, as a consequence of its voltagecurrent characteristic, will act as a voltage clamp to limit the magnitudes of voltage excursions on the line conductor 10 (d.c. case) or extreme variations from mean zero voltage (a.c. case.) A ground terminal 16 and a line terminal 18 of the varistor 14 are identified in FIG. 1 for correlation of the electro-mechanical structure of the device to the circuit arrangement.

The breaker switch 20 of the invention is located between the line conductor 10 and the line terminal 18 of the varistor 14. The mechanical linkage between the varistor 14 (alternatively, a surge arrestor circuit incorporating one or more varistors) and the switch 20 is indicated at 22. In the discussion to follow, it shall become apparent that the breaker switch 20 is responsive to the actual physical state of the varistor 14. Thus, and unlike the prior art, the breaker 20 provides for disconnection of the protective surge arrestor 14 only at such time as the arrestor 14 has experienced material degradation and in imminent danger of fire and/or explosion. Prior art safety devices have generally relied upon fuse protection responsive to the "surrogate" varistor measure of line current to determine whether or when to disconnect the arrestor 14, commonly resulting in premature, and often dangerous, removal of the arrestor 14.

Figure 2:
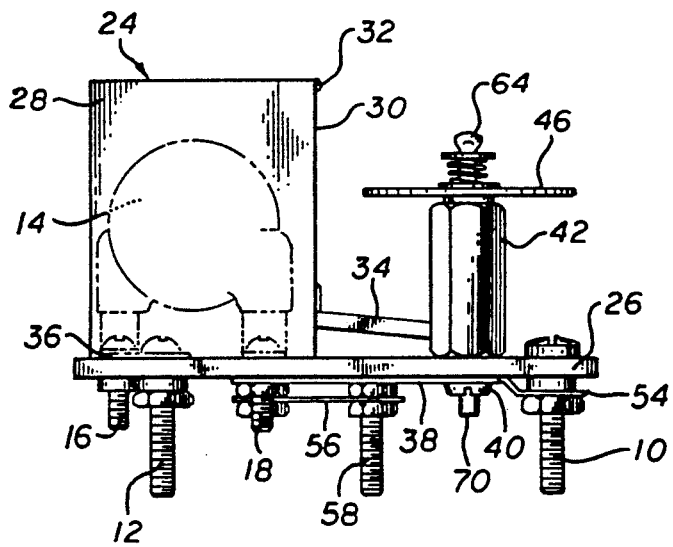
FIG. 2 is a side elevation view of the mechanism of the circuit breaker.
Figure 4:
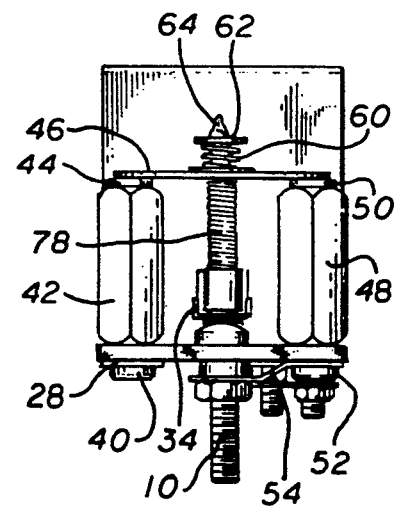
FIG. 4 is a front elevation view of the circuit breaker of the invention.
Figure 3:
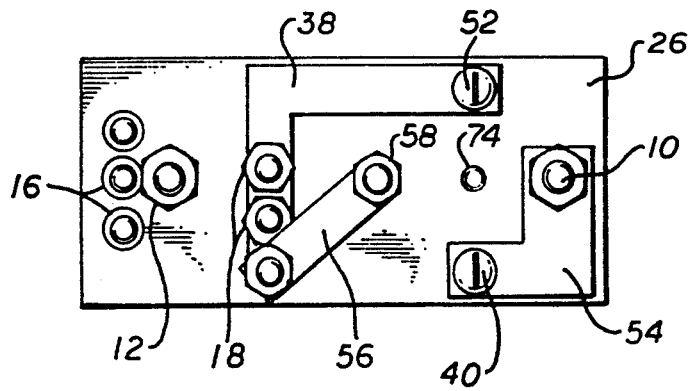
FIG. 3 is a bottom plan view of the invention for illustrating certain circuit interconnections.

FIG. 2 is a side elevation view of the physical mechanism for effecting operation of the circuit of FIG. 1. A discussion of this figure will proceed with simultaneous reference to features shown in the accompanying FIGS. 3 and 4. FIG. 3 is a bottom plan view of the device of FIG. 2 for assisting understanding of the complete layout of the circuity of the device while FIG. 4 is a front elevation view for understanding various important mechanical interactions.

Referring now to the aforesaid figures, the arrestor circuit comprises, in this particular instance, a parallel arrangement of three varistors 14 and is located within a substantially airtight housing 24 that is positioned upon a base 26 of appropriate dielectric material. The housing 24 is preferably formed of a rugged, heat-resistant phenol plastic material. It is formed in two parts. A first molded part 28 comprises four flat panels (three sides and one top) forming a sturdy, although open, arrangement. A fifth panel 30, located at the front, is affixed to the molded part 28 solely by means of a flexible hinge 32 that provides pivotal engagement between the top edge of the front panel 30 and an edge of the molded part 28. In the configuration as shown in FIG. 2, the front panel 30 is substantially flush with the molded part 28 of the housing 24 to provide a substantially airtight closure of the interior. (It will be appreciated from the discussion to follow that, in such a configuration, the switch 20 is closed and the surge arrestor 14 is "on-line.") A cantilevered arm 34 is affixed to the front of the panel 30. As will be seen, the free end of the arm 34 includes means for actuating the breaker switch 20 from its closed to its open position.

A copper strip 36 provides a conductive path between the ground (or low a.c.) terminal 12 and the ground terminal 16 of the varistor 14 while an L-shaped strip 38 at the bottom of the base 26 provides a conductive path between the line terminal 18 of the varistor 14 (actually, as mentioned earlier, the electrically-tied together terminals of three parallel varistors) and the base terminal 40 of the switch 20. A brass arm 42 of the switch 20 is in electrical and mechanical contact with the metallic screw that forms the base terminal 40. Similarly, a carbon washer 44 at the top of the arm 42 continues such electrical path for contacting a brass disk 46 whose vertical location affects the opening and closing of the switch 20.

An arm 48 of the switch 20 is located symmetrically with respect to the arm 42 about center of the disk 46. The arm 48 includes a carbon washer 50 for contacting the disk 46 and terminates in a metallic screw 52 that forms a second base contact of the switch 20. Such base contact is electrically connected to the line conductor terminal 10 by means of a copper conductor 54 as shown in FIG. 3. As can be seen in FIGS. 2 and 3, a conductor 56 provides electrical connection between the line conductor terminal 18 of the varistor circuit 14 and a terminal 58 that is provided for monitoring the status of the surge arrestor. This monitoring function is not shown on the schematic design of FIG. 1 and forms no part of the claimed invention.

Referring back to FIGS. 2 and 4, one can see that the brass disk 46 that provides electrical connection between the circuit that includes the metallic arms 42 and 48 is held in contact with the washers 44 and 50 by the downward-acting force of an upper spring 60. The spring 60 abuts a washer 62 that, in turn, is restrained by the flared head 64 of a central post (not clearly visible in FIG. 2 or FIG. 4, shown in partial and detailed view in FIG. 5.)

The post that terminates in the head 64 is held in place by a locking arrangement that is controlled by the positioning of the arm 34 which, as mentioned above, is fixed to the front panel 30. The details of the arrangement for locking the switch 20 into the closed position shown in FIGS. 2 and 4 can be seen with reference to FIG. 5, an exploded partial perspective view of the post locking mechanism. As can be seen, the arm 34 includes a cutout region 66 adjacent its free end. The region 66 includes a semi-circular cutout portion 68. A post 70 which, as mentioned earlier, terminates in the flared head 64, includes a reduced, notched region 72. A tubular piece 74 has an inner diameter of sufficient size to permit slidable movement of the post 70 therein. A hemispherical cutout window 76 in the tubular piece 74 permits accessing of the post 70 by the arm 34 s that the semi-circular portion 68 of the arm 34 can restrain movement of the spring-loaded post 70 by "grasping" the notch 72 through the window 76 when the front panel 30 (to which the arm 34, as mentioned earlier, is attached) is in the closed position as shown in FIG. 2. By holding the vertical position of the post 70 against an upwardly-acting spring force, discussed below, the flared head 64 is maintained at a predetermined position that allows the downward-acting force of the upper spring 60 to exert sufficient force upon the disk 46 to maintain mechanical and, thus, electrical contact between the disk 46 and the washers 44 and 60 to complete o close the circuit that includes the arms 42 and 48.

As can be seen, a lower spring 78, seated between the upper edge of the tubular piece 74 and the bottom of the disk 46, provides a counteracting upwardly-directed force against the bottom of the disk 46. The spring constant of the upper spring 60 and the lower spring 78 are selected so that, when the head 64 of the post 70 is locked into position, the downward-acting force of the upper spring 60 is sufficient to overcome the upward-acting force of the lower spring 78, seating the disk atop and in contact with the washers 44 and 50 as shown in FIGS. 2 and 4.

Figure 6A:
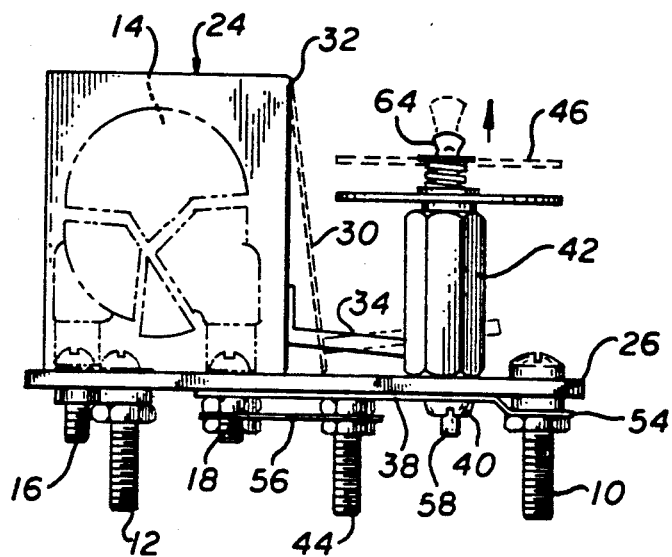
FIGS. 6(a) and 6(b) are side and front elevation views of the invention with the open switch configuration illustrated in shadow view.
Figure 6B:
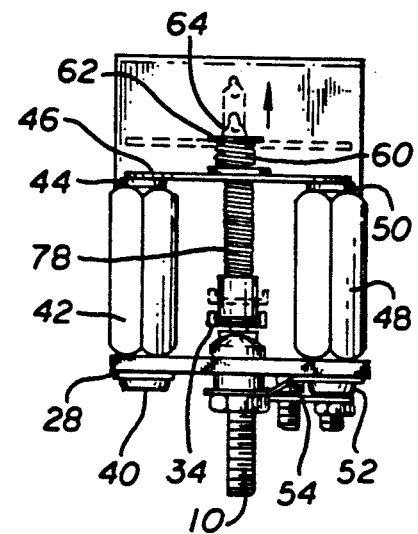

FIGS. 6A and 6B are side and front elevation views respectively of the device with the open circuit position of the breaker switch 20 shown in shadow view. The varistor 14 is illustrated in a fragmented state within the housing 24. This is intended to symbolize a surge arrestor whose useful life has ended and, due to excessive leakage current, has began to degrade as a consequence of $i^2R$ heating, initiating vaporization of the varistor material, whether silicon carbide or metal oxide. As mentioned earlier, the phenol plastic housing 24 is of sufficiently high melting temperature to withstand the associated temperatures. The metal oxides, silicon carbide and binders employed in commercially-available varistors will typically vaporize at temperatures below 2900 degrees C. During a short circuit "current run-away", the $i^2R$ power will heat an MOV varistor within one second to a point where the above-mentioned component elements will vaporize to create high pressure within the housing 24. The run-away will occur at the weakest points of the varistor 14, the disk being heated at a spot until arcing generates heat above 3800 degrees C and burns an actual hole in the varistor disk. The freed material of the hole generates all vapor pressure and.

Figure 5:
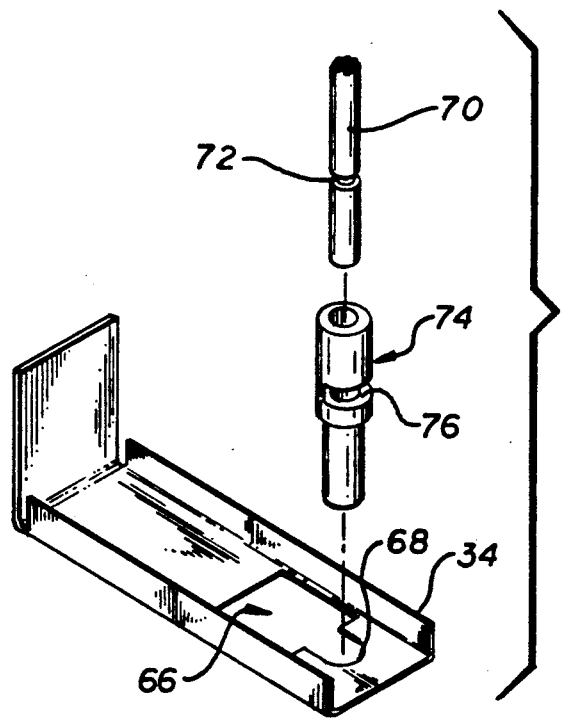
FIG. 5 is an exploded perspective view of the latching mechanism of the invention.

As a result of the substantial increase in pressure that accompanies varistor breakdown, the front panel 30 is forced to pivot about the flexible hinge 32 to the position disclosed in shadow outline. Such rotation is accompanied by a slightly counterclockwise movement of the arm cantilevered arm 34 as shown. The rotation of the front panel 30 extends the free end of the arm 34 as indicated. Referring such movement to FIG. 5, the forward movement of the arm 34 displaces the semi-circular cutout 68 from engagement with the notch 72 of the post 70. When this occurs, the force exerted by the compressed lower spring 78 can now cause upward movement of the disk 34 since the flared head 64 of the post 70 (and, of course, the post 70 itself) is no longer restrained by the interlocking of the notch 72 with the circular region 68. The upper spring 60 can no longer exert a effective downward-acting pressure since the vertical position of its upper edge is no longer fixed by the locked position of the flared head 64 of the post 70.

As can be seen, the release of the post 70 ultimately results in mechanical and, therefore, electrical disconnection of the brass disk 46 from contact with the washers 44 and 50 as required to close the electrical circuit. As mentioned previously, such disconnection is ultimately responsive to the emission of vapors within the housing 24 that characterizes the initiation of varistor 14 failure. Accordingly, the disconnection of the surge arrestor from the line conductor 10 is directly correlated to the actual physical state of the arrestor itself and does not rely upon indirect, and therefore inaccurate and imprecise, measures of the status of the device. Accordingly, the careful selection of fuses is not required to assure avoidance of fires and/or explosions that can characterize the presence of dangerously defective surge arrestors on a line conductor.

Thus, by applying the teachings of the present invention, one may obtain safe and assured removal of a dangerously defective surge arrestor from a line conductor. By utilizing the teachings of the invention, one can avoid the disadvantages and dangers associated with either premature or late disconnection of such potentially-dangerous devices. In a device constructed in accordance with the invention the power can be disconnected from the varistor and arcing discontinued in less than 20 milliseconds. While the response time of the device is equal to or better than that of a typical 15-ampere time-delayed fuse, it can handle fifteen (15) times the surge current without undesired disconnection.

While this invention has been described with reference to its presently-preferred embodiment, it is not limited thereto. Rather, this invention is limited only insofar as defined by the following set of patent claims and includes within its scope all equivalents thereof.

What is claimed is:

1. Apparatus for selectively disconnecting a surge arrestor of the type that includes at least one voltage-dependent resistor from a line conductor, said apparatus comprising, in combination:
   a) a substantially-airtight housing for accommodating said at least one voltage-dependent resistor;
   b) said housing including a hinge panel so that the attitude thereof is substantially responsive to a pressure buildup within said housing; and
   c) means exterior to said housing being coupled to said panel for disconnecting said line conductor from said surge arrestor in response to a predetermined increase in pressure within said housing.

2. Apparatus as defined in claim 1 wherein said means further includes;
   a) a cantilever arm, a first end of said arm being fixed to said hinge panel;
   b) a first conductor; and
   c) means responsive to the position of a second, opposed end of said arm for adjusting the position of said first conductor so that, in a first position, said surge arrestor is electrically disconnected to said line conductor and, in a second position, said surge arrestor is disconnected from said line conductor.

3. Apparatus as defined in claim 2 wherein said means for adjusting the position of said first conductor additionally includes:
   a) a post, said post having an intermediate notch of reduced diameter;
   b) an aperture adjacent said second end of said arm for selectively locking the vertical position of said post; and
   c) means for moving said first conductor to said first position when the vertical position of said post is locked and for moving said first conductor to said second position when the vertical position of said post is unlocked.

4. Apparatus as defined in claim 3 wherein said means for moving further includes:
   a) a first helical spring concentric with said post and located above said first conductor for moving said first conductor to said first position; and
   b) a second helical spring concentric with said post and located below said first conductor for moving said first conductor to said second position.

5. Apparatus as defined in claim 4 further characterized in that:
   a) said first conductor is a metallic disk;
   b) said means for disconnecting includes a pair of upright arms of conductive material, one of said arms being in mechanical and electrical connection with said line conductor and the other one of said arms being in mechanical and electrical connection with ground; and
   c) said disk contacts both of said upright arms in said first position and is spaced from said arms in said second position.

6. Apparatus as defined in claim 5 further including:
   a) a tubular piece;

b) the inner diameter of said tubular piece exceeding the outer diameter of said post;
c) said post being coaxial and slidable with respect to said piece; and
d) said piece having a semicircular window therein whereby said cantilevered arm may access said notch.

7. Apparatus as defined in claim 6 wherein said surge arrestor comprises a parallel arrangement of a plurality of voltage-dependent resistors.

8. Apparatus as defined in claim 6 wherein said voltage-dependent resistor is of silicon carbide.

9. Apparatus as defined in claim 6 wherein said voltage-dependent resistor is of metal oxide.

* * * * *